May 9, 1950

J. C. SCHULTZ 2,507,273

SEPARATOR FOR USE WITH HIGH-PRESSURE
OIL OR GAS-DISTILLATE WELLS
Filed Nov. 15, 1948

Inventor
John C. Schultz

By Clarence A. O'Brien
and Harvey B. Jackson
Attorneys

Patented May 9, 1950

2,507,273

UNITED STATES PATENT OFFICE 2,507,273

SEPARATOR FOR USE WITH HIGH-PRESSURE OIL OR GAS-DISTILLATE WELLS

John C. Schultz, Corpus Christi, Tex.

Application November 15, 1948, Serial No. 60,042

2 Claims. (Cl. 183—2.7)

This invention relates to a device for continuously separating water from oil and gas discharged from high pressure oil wells to prevent creation of emulsion in the oil, or for continuously separating water from distillate and gas discharged from high pressure gas-distillate wells to prevent the formation of hydrates in the distillate. In either case, the top inlet of the device is connected to the well head or "Christmas tree," a choke valve or flow wing is connected to the top outlet of the device through which oil and gas or distillate and gas are discharged under pressure, and flow of the separated water from the device through a bottom outlet thereof is controlled by an automatic liquid level controller which maintains the water in the device at a predetermined level below said outlet and which includes a motor valve interposed in a water discharge line connected to said bottom outlet.

The primary object of the present invention is to provide a device of the above kind which is very simple in construction and highly efficient in operation.

The exact nature of the present invention, as well as other objects and features thereof, will become apparent from the following description when considered in connection with the accompanying drawings, in which.

Figure 1:
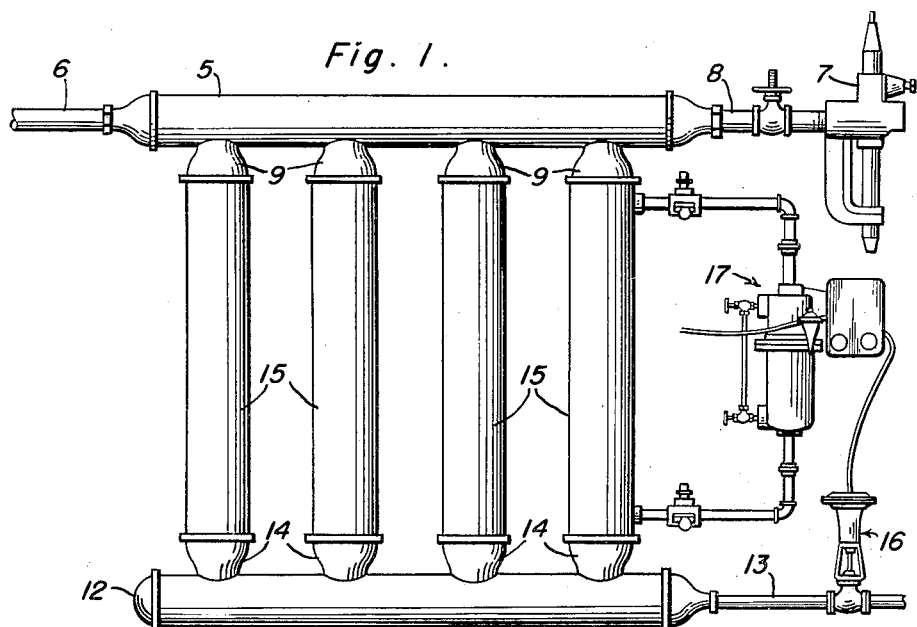
Figure 1 is a side elevational view of a separator embodying the present invention.
Figure 2:
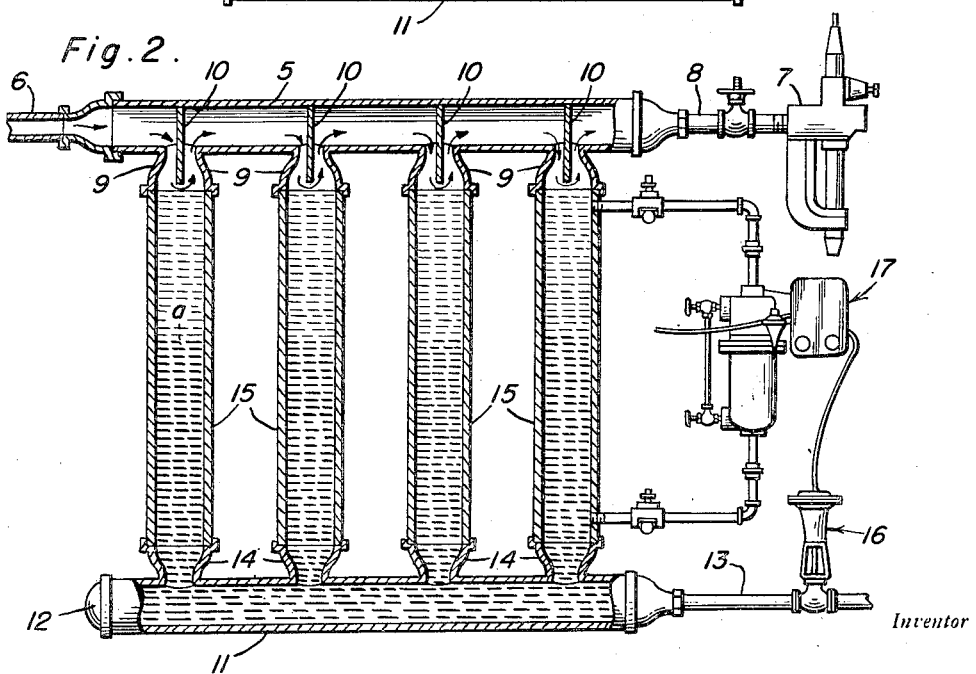
Figure 2 is a view thereof, partly in vertical section and partly in side elevation.

Referring in detail to the drawing, 5 indicates a horizontal top header or manifold having an inlet at one end adapted for connection by a pipe 6 to the head or "Christmas tree" of a high pressure well and having an oil or distillate and gas outlet at its other end to which the inlet of a conventional choke valve or flow bean 7 is connected by a valve controlled nipple 8. As usual, the choke valve or flow bean restricts flow therethrough so as to hold a pressure within the well and the separator. The fluid and gas usually expands from the choke valve or flow bean into a large pipe (not shown) leading to tanks, a separator, or wherever the oil or distillate is stored or processed. This expansion of the oil or distillate, gas and water under pressure causes emulsion in the oil or formation of hydrates in the distillate, and I prevent this by separating the water from the oil or distillate and gas before it flows through the choke valve or flow bean. The header or manifold 5 has a plurality of short depending branches 9, and transverse partitions or baffles 10 are provided in said header or manifold 5 so that one of the same extends downwardly into each of the branches 9 centrally of the latter.

The separator further includes a horizontal bottom header or manifold 11 which is closed at one end as indicated at 12, and which has a water outlet at its other end to which a water discharge line or pipe 13 is connected. The header or manifold 11 has a plurality of short upstanding branches 14, and each branch 9 of header 5 is connected to a branch 14 of header 11 by a vertical cylinder 15 which forms a settling chamber communicating at its lower end with the header 11.

Discharge of water from the separator through the line 13 is controlled by a motor valve 16 operatively connected to a conventional automatic liquid level controller 17, so as to maintain water in the separator at a predetermined lever a below the top header and its branches. The choke valve 7 may be of the type disclosed in the U. S. patent to J. H. Childress, No. 1,998,074, dated April 16, 1935, and the controller 17 may be of the type shown in the U. S. patent to L. J. Griffey No. 2,263,771, dated November 25, 1941.

In operation, the water, oil or distillate and gas flow under pressure from the well through pipe 6 into header 5, being repeatedly deflected downwardly through branches 9 by the baffles 10 so as to cause the water and oil or distillate to pass down out of the flowing gas and cause the water to settle and accumulate in the header 11 and the lower portions of cylinders 15. The oil or distillate settles on top of the water and overflows from the separator so as to pass with the gas through pipe 8 and choke valve 7 to the point of storage or processing. As the water has been removed before the oil or distillate and gas expand from the choke valve 7, creation of emulsion in the oil or formation of hydrates in the distillate is prevented. From time to time, the controller 17 opens motor valve 16 to allow discharge of water from the separator through pipe 13, thereby keeping the level of the water below the pipe 8 and header 5 within the cylinders 15, and allowing only oil or distillate and gas to pass through nipple 8 to choke valve 7.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

Having described the invention, what is claimed as new is:

1. A separator for use with high pressure oil or gas-distillate wells, comprising horizontal top and bottom headers respectively having a plurality of depending and upstanding branches, a vertical cylinder connecting each branch of the top header with a branch of the bottom header, means to connect one end of the top header to the "Christmas tree" of a well, a choke valve connected to the other end of said top header to hold a pressure within the separator and the well and control flow of oil or distillate and gas from the top header, transverse baffles in the top header depending into the branches of the latter, the bottom header having a water outlet pipe at one end, a motor valve in said water outlet pipe, and a liquid level controller operatively associated with one of said cylinders and operatively connected to said motor valve to automatically control flow of water from the separator through said water outlet pipe and to maintain water in said cylinders at a level below the top header and its branches.

2. A separator for use with high pressure oil or gas-distillate wells, comprising top and bottom headers, vertical cylinders connecting the top and bottom headers, transverse partitions in the top header for deflecting fluid and gas from the latter into the cylinders, means to connect one end of the top header to the "Christmas tree" of a well, a choke valve connected to the other end of said top header to hold a pressure within the separator and the well and control flow of oil or distillate and gas from the top header, the bottom header having a water outlet pipe at one end, a motor valve in said outlet pipe, and a liquid level controller operatively associated with one of said cylinders and operatively connected to said motor valve to automatically control flow of water from the separator through said water outlet pipe and to maintain water in said cylinders at a level below the top header.

JOHN C. SCHULTZ.

REFERENCES CITED

The following references are of record in the file of this patent:

UNITED STATES PATENTS

| Number | Name | Date |
|---|---|---|
| 249,487 | Shetter | Nov. 15, 1881 |
| 1,619,713 | Frean | Mar. 1, 1927 |
| 2,009,646 | Brady | July 30, 1935 |

OTHER REFERENCES

"Traps for saving gas at oil wells," Bureau of Mines Technical Paper 209; Hamilton, 1919; pages 29 and 30.